United States Patent

Schuenemann et al.

[15] 3,681,761

[45] Aug. 1, 1972

[54] ELECTRONIC DATA PROCESSING SYSTEM WITH PLURAL INDEPENDENT CONTROL UNITS

[72] Inventors: Claus H. Schuenemann, Schonaich; Wilhelm G. Spruth, Sindelfingen, both of Germany

[73] Assignee: International Business Machines Corporation, Armonk, N.Y.

[22] Filed: May 1, 1970

[21] Appl. No.: 33,567

[30] Foreign Application Priority Data

May 2, 1969 Germany ............P 19 22 415.8

[52] U.S. Cl. ..............................................340/172.5

[51] Int. Cl. ..............................................G06f 15/16

[58] Field of Search ....................................340/172.5

[56] References Cited

UNITED STATES PATENTS

| | | | |
|---|---|---|---|
| 3,328,767 | 6/1967 | Ottaway | 340/172.5 |
| 3,199,085 | 8/1965 | Rhodes et al. | 340/172.5 |
| 3,500,328 | 3/1970 | Wallis | 340/172.5 |
| 3,514,758 | 5/1970 | Bennett | 340/172.5 |
| 3,537,074 | 10/1970 | Stokes et al | 340/172.5 |
| 3,287,703 | 11/1966 | Slotnick | 340/172.5 |
| 3,462,742 | 8/1969 | Miller et al. | 340/172.5 |

*Primary Examiner*—Paul J. Henon
*Assistant Examiner*—Sydney R. Chirlin
*Attorney*—Hanifin and Jancin and Edward S. Gershuny

[57] ABSTRACT

A data processing system which consists of individual, essentially highly integratable, storage structures, which are linked with each other by means of a bus system, without the use of connecting, unordered logic circuits, and which perform the functions of the system control. The data processing system is composed of independent control units; the actual system control (CPU), and the individual controls (CON) associated with the Input/Output devices. A common bus system is employed for data and signal communication between the units. All these controls have identical circuitry, differing from each other only by the specific microprogram used. Logic personalization of the individual controls is ensured by their specific microprogram or by their table stored in read-only storages. A central control within the individual control units is not used, since a part of the operation code in each function unit is separately decoded.

5 Claims, 17 Drawing Figures

INVENTORS
CLAUS H. SCHUENEMANN
WILHELM G. SPRUTH

BY Edward S. Gershuny
ATTORNEY

| μ-NO. | LS 1-REG.-NO. 1 | 2 | 3 | 4 | 5 | ---- | 64 | LS 2-REG.-NO. 1 | 2 | 3 | 4 | 5 | ---- | 64 | AN-μ |
|---|---|---|---|---|---|---|---|---|---|---|---|---|---|---|---|
| 1 (F) | | | 110 | | | | | 010 | 100 | RESFD | | 001 | | | 01111110 |
| 2 (F) | | | 110 | | 101 | | | 010 | 100 | XXX | | 001 | | | 01111111 |
| 3 (TMB) | | | 110 | | 101 | | | 010 | 100 | XXX | | 001 | | | 1000000 0/1 |
| 4 (ADD 2) | | | 110 | | 101 | | | 010 | 100 | 110 | | 001 | | | 10000001 |
| 5 (SL) | | | 100 | | 101 | | | 010 | 100 | 110 | | 001 | | | 10000010 |
| 6 (SR) | | | 100 | | 010 | | | 010 | 100 | 110 | | 001 | | | 10000011 |
| REP ↓ | | | | | | | | | | | | | | | |
| 7 (TMB) | | | 100 | | 010 | | | 010 | 100 | 110 | | 001 | | | 1000010 0/1 |
| 8 (SL) | | | (1)000 | | 010 | | | 010 | 100 | 110 | | 001 | | | 10000110 |
| 9 (SR) | | | (1)000 | | 001 | | | 010 | 100 | 110 | | 001 | | | 10000111 |
| REP ↓ | | | | | | | | | | | | | | | |
| 10 (TMB) | | | (1)000 | | 001 | | | 010 | 100 | 110 | | 001 | | | 1000100 0/1 |
| 11 (ADD 2) | | | (1)000 | | 001 | | | 010 | 100 | (1)110 | | 001 | | | 10001001 |
| 12 (SL) | | | (0)000 | | 001 | | | 010 | 100 | (1)110 | | 001 | | | 10001010 |
| 13 (SR) | | | (0)000 | | 000 | | | 010 | 100 | (1)110 | | 001 | | | 10001011 |

ELECTRONIC DATA PROCESSING SYSTEM WITH PLURAL INDEPENDENT CONTROL UNITS

BACKGROUND OF THE INVENTION

The invention relates to an electronic data processing system with storage units, in which tables of arithmetic functions are stored, and with bus systems for the transmission of data, addresses and control signals between the system elements.

The invention proceeds from data processing systems in which certain arithmetic functions, such as, for example, multiplication, are performed by means of tables stored in the storages of these systems and which contain the result of the arithmetic combination of two operands, (e.g., the product of the two operands in the case of multiplications).

The control of the program sequence in existing electronic data processing equipment has its origin in the program storages of the central units in which the program consisting of instructions—micro and macro instruction—is stored. A micro instruction register is initially loaded from the program storages of the system. The micro instruction read into this register is, as a rule, the first micro instruction of a micro instruction sequence. The first micro instruction is decoded in a decoder and transferred to a micro instruction sequence control. Systems have become known in which the micro instruction sequence control consists of a matrix, the lines of which are excited by the output signals of the micro instruction decoder. The gate control signals for the respective micro operation are formed at the cross points of a selected line and particular columns of the matrix. The micro instruction sequence control also generates the address of the next micro instruction which can be modified by means of certain machine conditions with the help of special switches.

The gate control signals derived by way of central decoding are routed to the individual processing locations of the system where they implement the required operations. The logic structures used in existing data processing systems follow no particular order, and, as sequential networks, from several aspects do not represent optimum solutions for the system control of a data processing system. These aspects concern in the first place the flexibility of a system, for logic function circuits once designed and installed in a machine can not be altered without going to excessive expense. Therefore, a data processing system designed for commercial applications cannot be conveniently redesigned for purely scientific purposes.

Moreover, the use of central instruction decoding prevents maximum processing speeds being obtained, which in such instances are limited by the logic structure of the system, rather than the speed of the circuits and components employed.

In addition to these disadvantages, existing systems have a further disadvantage which is due to the hybrid character of the total design of the system comprising storages and logic sequential networks. It is the latter disadvantage which accounts for the considerable expenditure involved in the testing and maintenance of electronic data processors.

It is an object of the invention to eliminate in particular the above disadvantages inherent in existing data processing systems.

SUMMARY OF THE INVENTION

For an electronic data processing system with storage units in which tables of arithmetic functions are stored, and with bus systems for the transmission of data, addresses and control signals between the system elements, one embodiment of this invention is characterized in that the system consists of a number of autonomous system elements representing the system control and the control of the Input/Output devices, that these system elements consist of further storages which contain tables for performing logic functions and microprograms tailored to the functions of the Input/Output devices, and that the instructions transmitted over the bus are decentrally decoded at the location of execution by means of the decoders in the system elements.

It is a further feature of this data processing system that the microprogram storage is coupled with the branch control unit (branch unit), in which a truth table for performing the logic function $$d=(b\wedge c)\not\vee a$$

is stored, in a manner that it forms a part $d$ of the address of the next micro instruction in accordance with this function, wherein the values $b$ are transmitted to the branch unit from the data bus common to the system control, while the values $c$ are transferred from the common address bus.

Yet a further advantageous embodiment of this data processing system is characterized in that the Input/Output devices are controlled by means of control units incorporated in and connected to the system control through buses, that these control units differ from the system control and the other control units only by the microprogram stored in them, and in that the control units are linked with the bus of the system control or the Input/Output devices by means of parallel gate circuits.

The advantages of the invention which, as mentioned, comprise the elimination of the described disadvantages of existing data processing systems, are obtained in that the electronic data processing system is comprised, in the main, only of storagelike structures and of essentially identical circuit techniques for the system control and the control of the Input/Output devices, taking into account that the logic functions are performed by means of truth tables contained in the storages.

Decentralized decoding of the instructions and the use of common buses results in an increase of the operating speed and a reduction in the error frequency. The almost identical circuit design both of the central control and the controls of the Input/Output devices leads to an extremely economical price structure with regard to the manufacture of such data processing systems. In view of the fact that a control of a printer differs from the control for a disk storage or a punch card unit only by the microprogram contained in the respective storages, one type of control can be universally applied by loading different microprograms into the read/write storages or by exchanging complete read-only storages in which the microprogram is stored.

Also by loading other microprograms into the system control (CPU), the latter, without changing existing circuits, can be readily adapted to commercial or scientific applications.

The foregoing and other objects, features and advantages of the invention will be apparent from the following more particular description of the invention as illustrated in the accompanying drawings.

DESCRIPTION OF THE PREFERRED EMBODIMENTS

Figure 1:
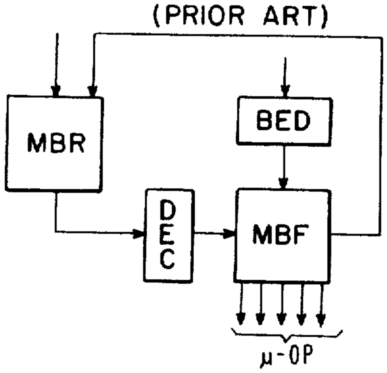
FIG. 1 (PRIOR ART)
FIG. 1 shows prior art micro instruction controls.

FIG. 1 shows the control of a micro instruction sequence and the generation of the gate control signals for performing the micro operations as are utilized in existing data processing systems. The micro instruction register MBR is initially loaded from the program storages of the system. The micro instruction read into this register is, as a rule, the first micro instruction of a micro instruction sequence. The first micro instruction is decoded in the decoder DEC and transferred to the micro instruction sequence control MBF. Systems have become known in which the micro instruction sequence control consists of a matrix, the lines of which are excited by the output signals of the micro instruction decoder. The gate control signals for the respective micro operation are formed at the cross points of a selected line and particular columns of the matrix. The micro instruction sequence control also generates the address of the next micro instruction which can be modified by means of certain machine conditions with the help of special switches BED.

TYPICAL STRUCTURE OF THE SYSTEM CONTROL

Figure 2:
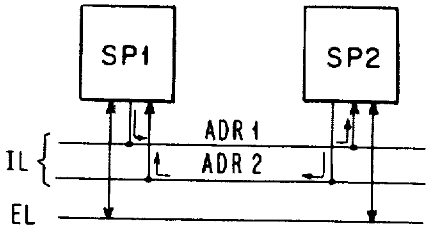
FIG. 2 is a block diagram of the typical structure of the function control units on which the system control is based.

FIG. 2 shows the typical structure of the function units of which the control of the electronic data processing system in accordance with the invention consists. As is hereafter described, this structure permits the control of the system to be essentially decentralized so that, in principle, the number of internal or external units of the system (several central units, peripheral equipment) is of no importance.

The first storage arrangement SP 1, which can, for example, take the form of a highly integrated arrangement with a minimum number of external linkage paths (similar to the remaining storages of the system), supplies address information for the second storage arrangement SP2 as output information on the internal bus IL. The data of the second storage arrangement thus addressed can be used for addressing an information field in the first storage arrangement during the next cycle, the information being transferred to the external bus EL either in part or in full. This information can also be used in part or in full for addressing as described.

The bus system is advantageously designed in a manner that it suits the highly integrated design of the storages. Therefore, only one bus is provided for the input and output data, the input and output functions of which are controlled by means of gate circuits integrated in the storage substrate. The same applies to the buses for transferring the address and control information between the system elements.

The structure shown in FIG. 2 can perform comparatively complex functions at a relatively low storage capacity. In view of this it is possible to design the complete control system of a data processor of a number of such or similar structures.

Figure 3:
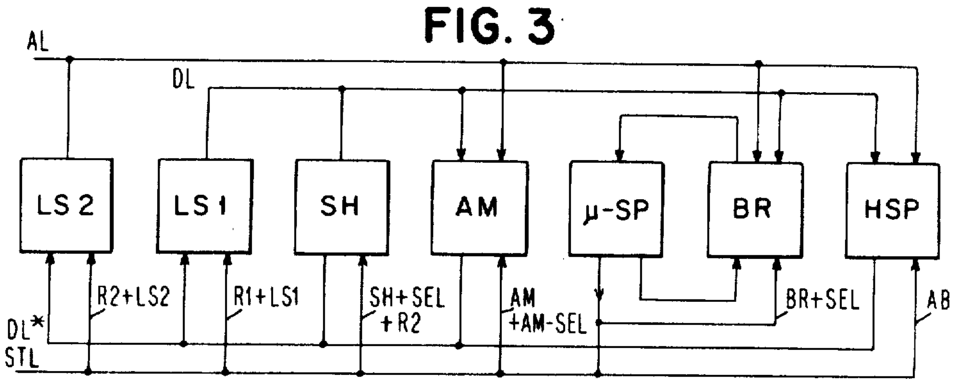
FIG. 3 is a block diagram of a complete system control.

A control of this kind is shown in FIG. 3. The coupling of the microprogram storage $\mu$–SP to the branch unit BR is very similar to the arrangement of FIG. 2. The output signals of the microprogram storage $\mu$–SP are transferred as control signals over the control signal bus STL, for example, to the local storages (working storages) LS 1 and LS 2, the shift unit SH, the arithmetic unit AM or the main storage HSP for performing the next operation, which may be a micro operation. The bus principle permits the said units to transfer data or address information to a data bus or an address bus or to receive, in addition to control information, data over a bus DL.

Figure 4:
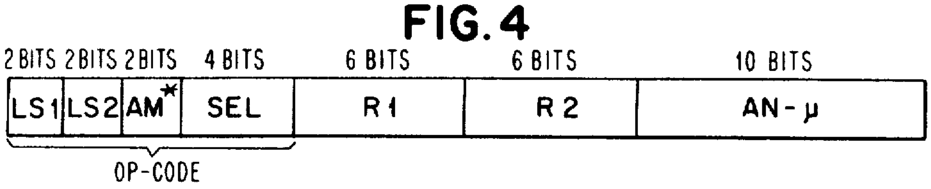
FIG. 4 is a representation of the format of a micro instruction.

With regard to the control of the system control CPU, as is shown in FIG. 3, it is important that the 10 bit field of the operation code (OP code) of the micro instructions, the format of which is shown in FIG. 4, is not decoded in the manner known from existing systems, but that each working storage LS 1, LS 2 and the units SH, AM, and BR (which are used for function control: i.e., for the control of arithmetic and logic functions) extract from the transmitted field of the operation code of a micro instruction only those control bits which they require for implementing a specific operation. This means that a working storage, rather than fully decoding the field of the OP-code, only decodes a particular part which permits it to differentiate whether a read operation, a write operation or a read/write operation is to be performed. Examples for coding the OP-code field are hereafter described in conjunction with an example of the most frequently employed micro instructions of the system.

In the implementation of such micro instructions, information is addressed in the working storages LS 1 and LS 2, read and subsequently transferred to the arithmetic unit AM over buses DL and AL. The result is issued over bus DL and re-stored in one of the two working storages.

Figure 5:
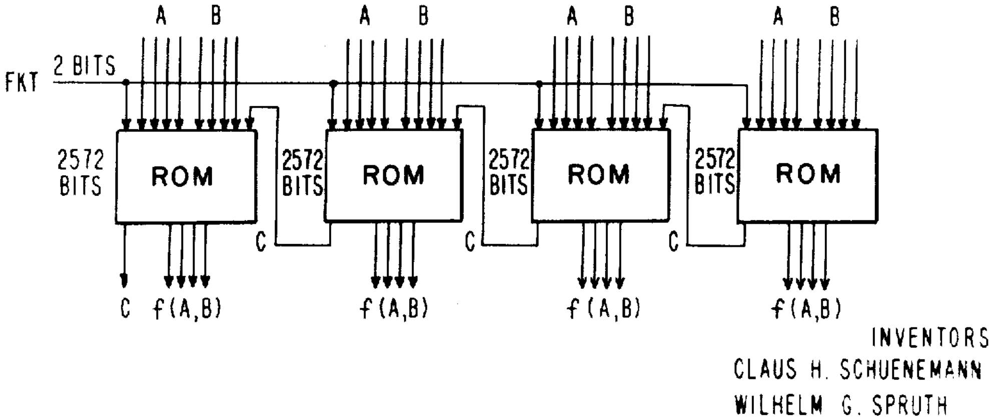
FIG. 5 is a block diagram of a function control comprising 4 read-only storages.

As is hereafter shown, the storage structure, in a slightly modified form, may also be employed for performing arithmetic and logic functions. FIG. 5 shows an arrangement which consists of only four read-only storages ROM, each having a capacity of 2 572 bits, and which is suitable for four different functions:

binary addition (ADD)
ORING (also exclusive) (XOR)
inversion (INVERT)

In this arrangement four bits are provided for the data to be linked and the operands A and B, two bits for the selection of the above four functions, one bit for a carry, if any, which may, for example, result from a binary addition, and four bits for each storage ROM for data output.

Addition

The operands A and B to be linked serve as an address for controlling the storages ROM in which the function tables are stored. The arrangement of FIG. 5 is relatively slow, particularly on account of the serial handling of the carry C during additions.

Figure 6:
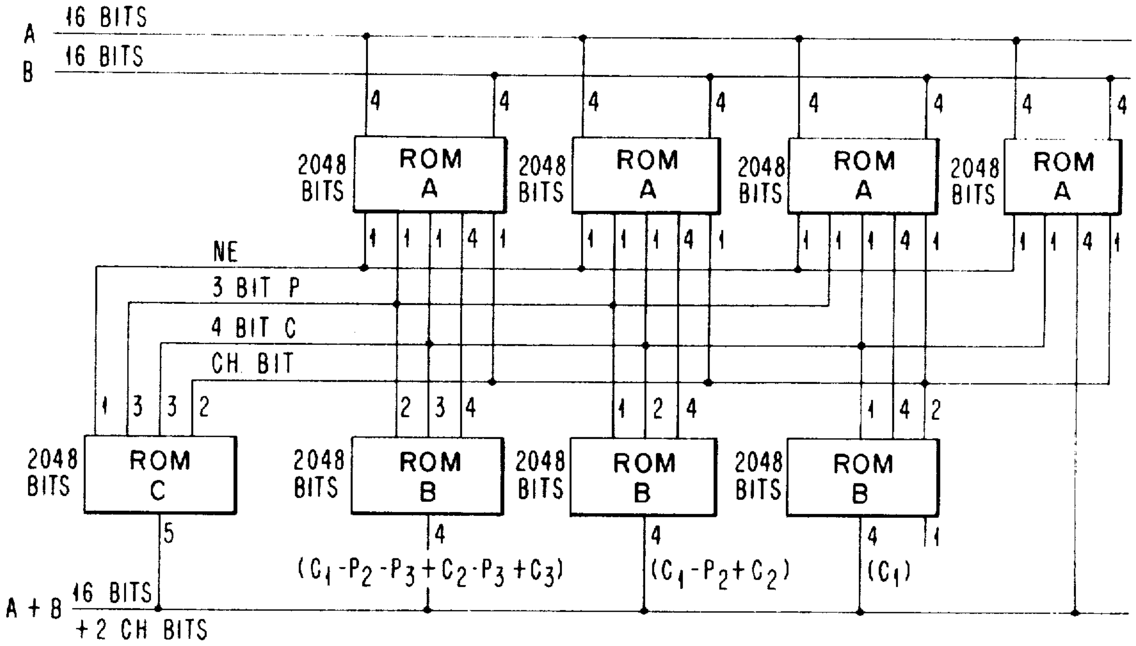
FIG. 6 is a block diagram of a function control designed for a higher speed than that of FIG. 5.

A version employing higher speeds is shown in FIG. 6. This arrangement consists of the storage blocks ROM A, ROM B, and ROM C which perform different functions. Whereas storages ROM A, for example, form results without considering carries C, if any, during addition, storage ROM B simultaneously process the carries, while storage ROM C performs particular control functions, such as, for example, a propagating carry P, the zero result NE, the check bit $CH_H$ for the high-order positions, and the OP-code. The check bit $CH_L$ for the low-order positions is generated by means of the storage ROM C which is shown on the extreme left of the figure.

Figure 7:
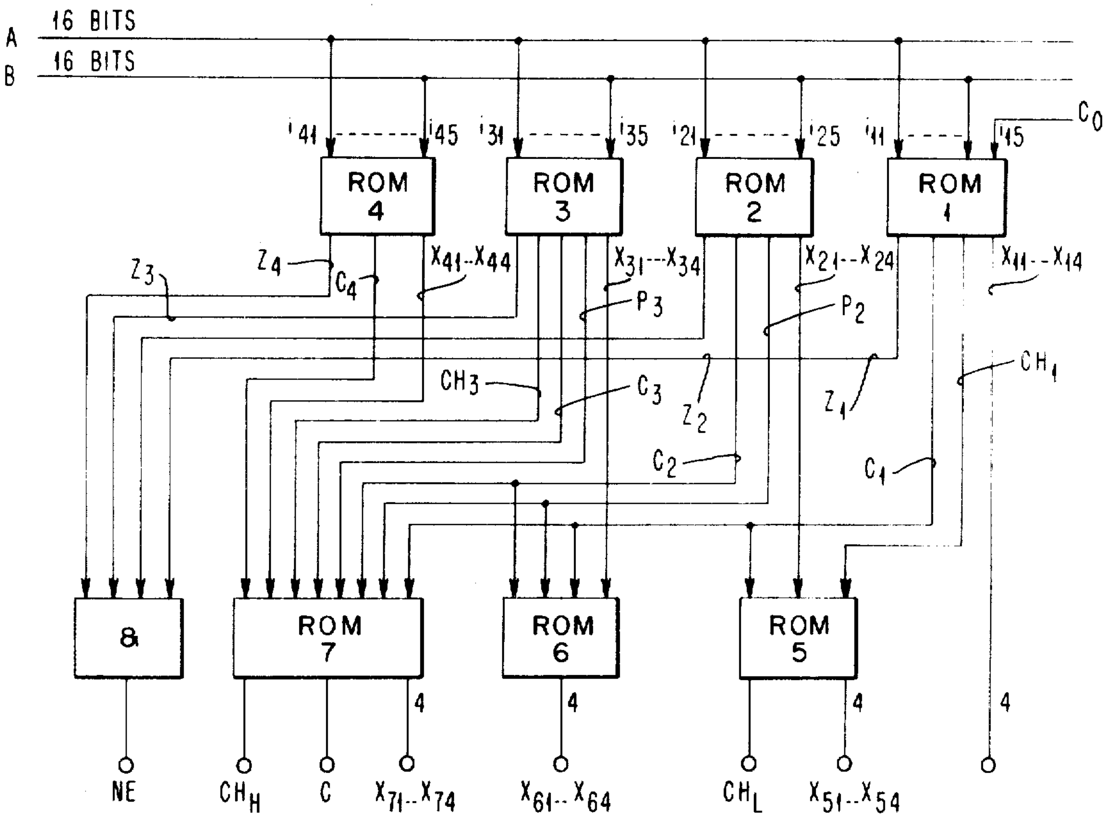
FIG. 7 is a block diagram of a binary addition.

FIG. 7, which is very similar to FIG. 6, serves to explain the operations necessary for binary addition. As already mentioned, specific tables are stored in the storages ROM. For addition, for example, the following Table 1 can be provided:

TABLE 1

| A | | B | | A and B | | C |
|---|---|---|---|---|---|---|
| $x_1$ | $x_2$ | $x_3$ | $x_4$ | $Y_1$ | $Y_2$ | |
| 0 | 0 | 0 | 0 | 0 | 0 | 0 |
| 0 | 0 | 0 | 1 | 0 | 1 | 0 |
| 0 | 0 | 1 | 0 | 1 | 0 | 0 |
| 0 | 0 | 1 | 1 | 1 | 1 | 0 |
| 0 | 1 | 0 | 0 | 0 | 1 | 0 |
| 0 | 1 | 0 | 1 | 1 | 0 | 0 |
| 0 | 1 | 1 | 0 | 1 | 1 | 0 |
| 0 | 1 | 1 | 1 | 0 | 0 | 1 |
| 1 | 0 | 0 | 0 | 1 | 0 | 0 |
| 1 | 0 | 0 | 1 | 1 | 1 | 0 |
| 1 | 0 | 1 | 0 | 0 | 0 | 1 |
| 1 | 0 | 1 | 1 | 0 | 1 | 1 |
| 1 | 1 | 0 | 0 | 1 | 1 | 0 |
| 1 | 1 | 0 | 1 | 0 | 0 | 1 |
| 1 | 1 | 1 | 0 | 0 | 1 | 1 |
| 1 | 1 | 1 | 1 | 1 | 0 | 1 |

In the chosen example, operands A and B are two-position dual numbers with positional values ranging from $x_1$ to $x_4$. The result of the addition of the operands A and B is composed of the positional values $y_1$, $y_2$, and the carry C.

Figure 8:
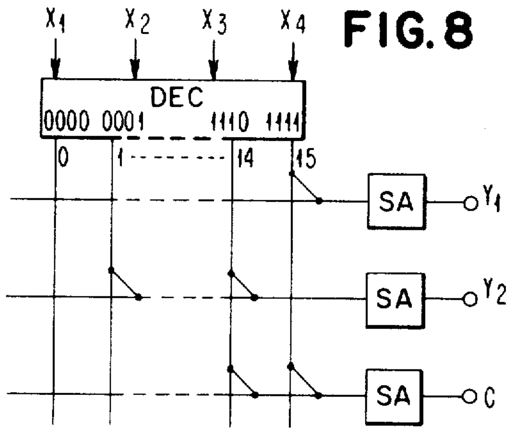
FIG. 8 is a representation of a typical read-only storage decoder.

The result in the stored table is located, for example, by means of a decoder such as that shown in FIG. 8. This decoder derives from the available positional values $x_1$ to $x_4$ the corresponding columns 0 to 15 which correspond to the binary values 0000 to 1111. In the matrix connected to the output of the decoder DEC, certain columns are excited with the help of a specially selected cross-point coupling, the output signals of which are amplified in the read amplifiers SA so that the result is supplied by the values $y_1$, $y_2$, and C. In FIG. 7 each one of the individual blocks ROM 1 to ROM 7 represents a realization of a table. In this arrangement addition is completed after two stages have been passed, since the arrangement is designed so that waiting for carries, if any, is rendered superfluous. Carries, if any, are taken into account by the stored logic structure of the arrangement. In the example of FIG. 7, 16-bit operands are binarily additively linked. As is shown in FIG. 7, the individual bits of the operands are referred to as $i_{11}$ to $i_{45}$. During addition, values to be issued and intermediate values are generated in the individual storage stages. These values are individually identified in FIG. 7. The identifications imply the following meanings:

| | |
|---|---|
| $x_{i1}$–$x_{i4}$ | are generated by binary addition of $i_{i1}$–$i_{i4}$ to $i_{i5}$–$i_{i8}$ (taking into account a carry $C_0$, if any). |
| $C_i$ | is the carry obtained during this addition. |
| $P_i$ | is a bit indicating whether a carry from the preceding stage may result in a carry to the next stage (this only applies in cases where all values $x_{i1}$ to $x_{i4}$ are "1"). |
| $CH_i$ | indicates whether the modulo-2 sum of $x_{i1}$–$x_{i4}$ is "0" or "1". (parity check). |
| $Z_i$ | indicates whether all values $x_{i1}$–$x_{i4}$ and $c_i$ are "0". |
| $CH_L$ | indicates whether the eight low-order bits of the result contain an even or uneven number of "1's". |
| $CH_H$ | indicates whether the eight high-order bits of the result contain an even or uneven number of "1's". |

For preparing the table the following rules have to be observed, in addition to those applicable to binary addition:

1. $x_{i1}$–$x_{i4}$ ($i = 5,6,7$) are generated by binarily adding the individual functions $U_i$ (of the carries of the preceding stages) to the results which are available in the storage blocks ROM 2, ROM 3 and ROM 4. Thus the following values are obtained:

$U_5 = C_1$
$U_6 = C_1P_2 + C_2$
$U_7 = C_1P_2P_3 + C_2P_3 + C_3$

2. The following equation applies to the last carry (storage block ROM 7):

$$C = C_4 + x_{41} \cdot x_{42} \cdot x_{43} \cdot x_{44} \cdot U_7$$

3. The following equation applies to the check bit of the low-order positions (storage block ROM 5):

$CH_L = CH_1\ CH \cdot (x_{81}-x_{84})$.

4. The following equation applies to the check bit of the high-order positions (storage block ROM 7):

$CH_H = CH_3\ CH\ (x_{71}-x_{74})$.

5. The following equation applies to forming the zero result:

$NE = Z_1 \cdot Z_2 \cdot Z_3 \cdot Z_4$.

Shift

The shift operation can also be performed by means of tables stored in the read-only storages.

TABLE 2

| A/B | | | S | | | A* / B* |
|---|---|---|---|---|---|---|
| $x_1$ | $x_2$ | $x_3$ | $x_4$ | $Y_1$ | $Y_2$ | $y_3$ |
| 0 | 0 | 0 | 1 | 0 | 0 | 0 |
| 0 | 0 | 1 | 0 | 0 | 1 | 0 |
| 0 | 0 | 1 | 1 | 0 | 0 | 0 |
| 0 | 1 | 0 | 0 | 1 | 0 | 0 |
| 0 | 1 | 0 | 1 | 0 | 0 | 1 |
| 0 | 1 | 1 | 0 | 1 | 1 | 0 |
| 0 | 1 | 1 | 1 | 0 | 0 | 1 |
| 1 | 0 | 0 | 0 | 0 | 0 | 0 |
| 1 | 0 | 0 | 1 | 0 | 1 | 0 |
| 1 | 0 | 1 | 0 | 0 | 1 | 0 |
| 1 | 0 | 1 | 1 | 0 | 1 | 0 |
| 1 | 1 | 0 | 0 | 1 | 0 | 0 |
| 1 | 1 | 0 | 1 | 0 | 0 | 1 |
| 1 | 1 | 1 | 0 | 1 | 1 | 0 |
| 1 | 1 | 1 | 1 | 0 | 1 | 1 |

For a three-bit $x_1$ to $x_3$ operand A or B, Table 2 shows the new values A* or B* for a shift of the operand by one bit position to the left or right. The direction and magnitude of the shift S are determined by the $x_4$ bit. If $x_4$ is zero, the operand is shifted to the left by one bit position, while it is shifted by one bit position to the right, if it is one. The bit configuration after the shift is determined by the $y_1$ to $y_3$ bits. Out of the 16 configuration possibilities, which result during the shift, several occur a number of times so that the seven bit configuration of Table 3 cover all possibilities arising during shifting.

TABLE 3

| $Y_1$ | $Y_2$ | $y_3$ |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |

Figure 9:
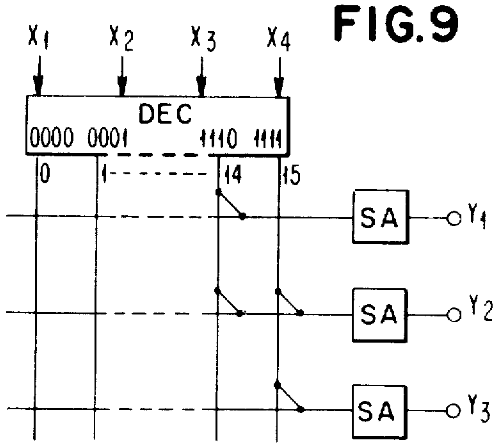
FIG. 9 is a representation of a typical table realized in a read-only storage.

The read-only storage arrangement, as shown in FIG. 9, represents a technical realization of the shift table in accordance with Table 2. Similar to the addition example, the bits $x_1$ to $x_4$ are decoded in the decoder DEC so that each one of them addresses a specific column of the storage matrix. With the help of the coupling points to the lines, with the outputs of which the read amplifiers SA are linked, the configuration of the shifted operands A* or B* with the bit positions $y_1$ to $y_3$ can be reproduced.

Similarly, for performing logic functions, read-only storages can be used in which the truth tables of the functions are stored. With the aid of decoding, columns can be determined which, when coupled to specific columns, lead to the required logic output result being formed.

Branching of the Micro Program

Figure 10:
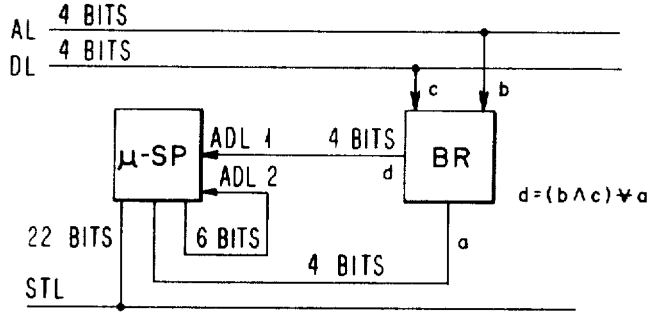
FIG. 10 is a block diagram showing the combination of a microprogram storage with a branch unit.

FIG. 10 is a more detailed view of the bit lines for combining the microprogram storage $\mu$-SP with the branch unit BR. In the present example the micro instructions read from the microprogram storage consist of 32 bits, 22 of which are directly transferred to the control bus STL. In accordance with the format shown in FIG. 4, the bits transferred to the control bus STL are the first 22 bits of a micro instruction. The remaining 10 bits serve to address the next micro instruction in the microprogram storage $\mu$-SP. Out of the 10 address bits, four are used for addressing the branch unit BR which is designed as a read-only storage. These four bits represent the input information $a$. Further input information $b$ and $c$, which each consist of four bits, are transferred to the branch unit BR over the address bus AL and the data bus DL. From this input information the branch unit generates the address information $d$ which is transferred over the address bus ADL1 to the microprogram storage and forms part of the address of the next micro instruction to be fetched. The linkage of the output information d with the input information $a$, $b$, and $c$ can be represented by the following equation:

$$d=(b \wedge c) \vee a$$

The remainder of the sequential address is formed by the six bits which are contained in the address part of the micro instruction and which are transferred over bus ADL 2 to the address decoder of the microprogram storage. By means of the input information $b$ and $c$ it is also possible to execute branch instructions and test mask operations (TMB).

Timing

Timing of the system can be selected as described below:

Each machine cycle consists of three sub-cycles, such as for example, a.
1. Reading from working storage LSi
2. Reading from arithmetic and logic unit (AM FIG. 3)
3. Writing into working storage LSi (plus reading of function control, plus next micro instruction)

or b.
1. Reading from working storage
2. Blind operation (e.g. reading a USE instruction into the function control)
3. Writing into the working storage (reading of function control, next micro instruction)

or (for storage/main storage operations)

c.
1. Reading into working storage (plus request for access to bus)
2. Blind operation (e.g., main storage access)
3. Blind operation (e.g., reading from main storage)

A read operation of the mainstorage is performed during the sub-cycles 2 and 3. Data is available at the end of the second sub-cycle. Write operations are carried out during the first sub-cycle of the subsequent machine cycle. The validity checks of the storage addresses and the storage protection checks, which are also possible in the system in accordance with the invention, are performed for all storage access operations outside the above timing control.

Figure 11:
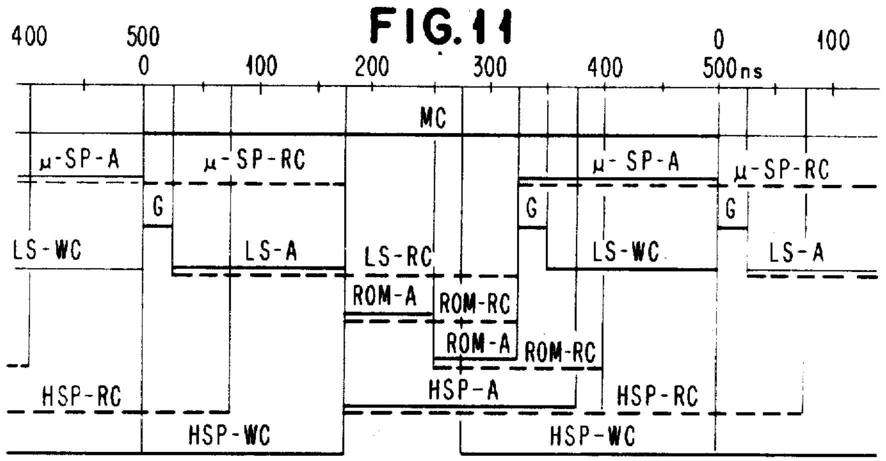
FIG. 11 is a timing diagram of the system time control.

FIG. 11 is a timing diagram including a survey of the timing control of the system. The different system components are based on the following time assumptions:

| | | |
|---|---|---|
| Main Storage | Read cycle HSP–RC | 400 ns |
| | Storage access HSP–A | 200 ns |
| Microprogram Storage | Read cycle $\mu$–SP–RC | 350 ns |
| | Storage access $\mu$–SP–A | 175 ns |
| | As the microprogram storage $\mu$–SP, which is designed as an updatable read–only storage, is only read during normal operation, a special write cycle need not be provided. | |
| | For initial program loading, a write cycle of 350 ns is sufficient. | |
| Working Storage | Read/write cycle LS–RC/WC | 450 ns |
| | Storage access LS–A | 150 ns |
| Gate Circuits | The delay period for gate circuits is about | 12.5 ns |
| | so that for two series–connected gate circuits this period is | 25 ns |

Input/Output Controller

The system control CPU communicates with the connected Input/Output devices E–/A–G and other peripheral units through controllers CON. These controllers are control units ANS which are arranged in the system control CPU, link a specific Input/Output device with the system control, and which are particularly tailored to the Input/Output device selected. The design and operation of a controller CON are very similar to those of the system control CPU. The controller consists of two working storages, one arithmetic and logic unit AM and a function control, which is similar to the combination of $\mu$–SP and BR. Thus, both the system control CPU and the control CON for the Input/Output devices can be constructed using identical circuit structures or system elements. Personalization in the form of a system control or a control for a tape unit is essentially obtained by means of the stored microprogram. The associated control buses are used to interrupt the communication between any one of the controllers and the system control.

Figure 12:
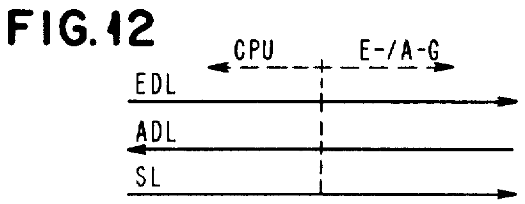
FIG. 12 shows connections of the Input/output unit control devices to the system control.
Figure 13:
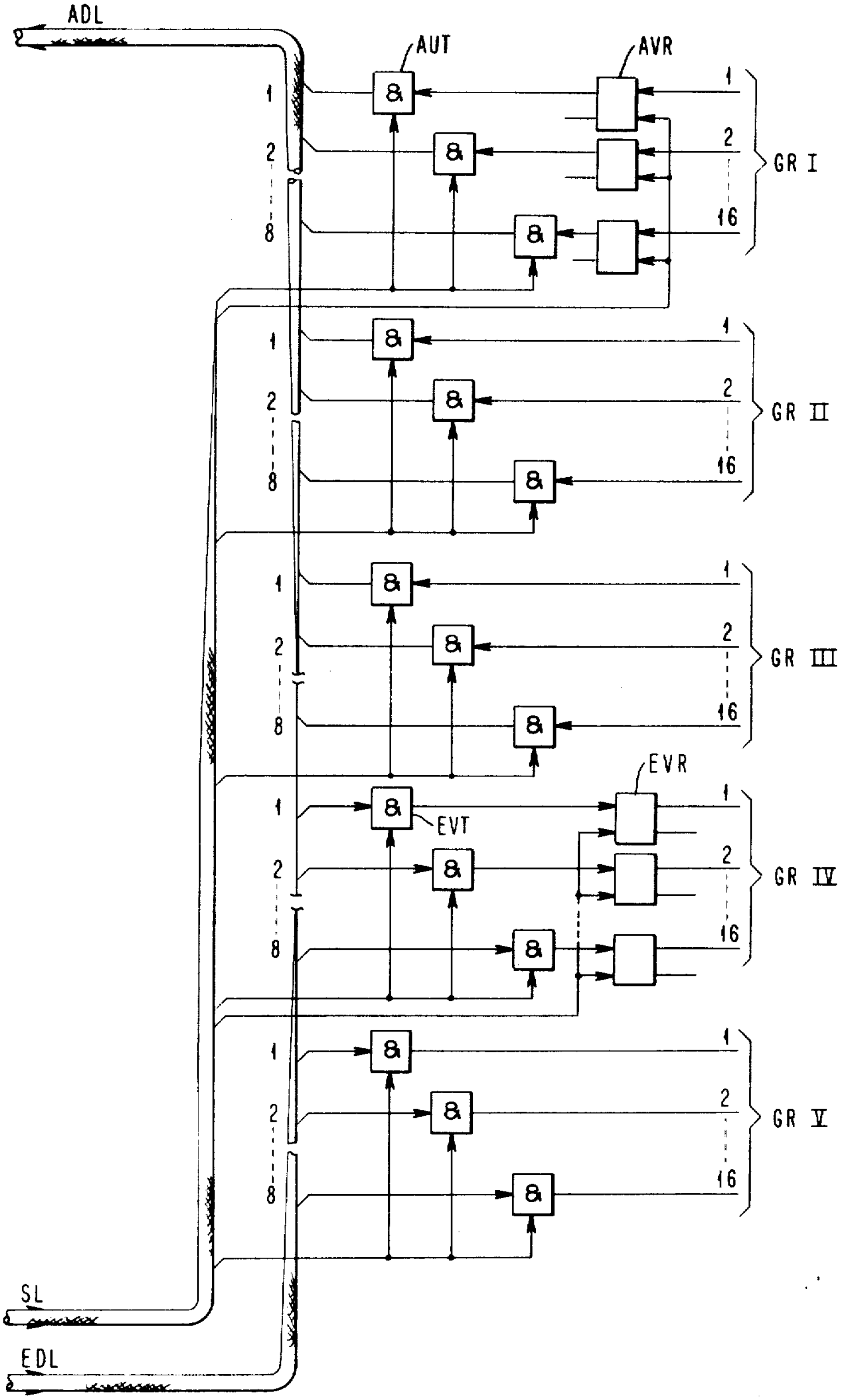
FIG. 13 is a block diagram of the connections in accordance with FIG. 12.

The controllers CON with their associated Input/Output device, are interlinked through the connecting system shown in FIG. 12. This system consists of an eight-bit input data input line EDL, and eight-bit data output line ADL and an eight-bit control line SL. Within the Input/Output device the data is transferred to the respective locations by means of AND gates or, if required, through latch circuits which are controlled by the control data on the control bus SL. These AND gates and latch circuits are arranged in the Input/Output device. The connected system between the Input/Output device and the Input/Output controller CON invariably uses the same lines. In the present instance, 24 lines are employed, not considering current supply and non-logic function lines. The connecting system is commonly used by all the Input/Output devices and its design is shown in FIG. 13. The data of the input bus EDL is transferred through a number of input AND gates EUT and input latch circuits EVR. These gates and latch circuits are controlled with the aid of control data which is fed to these arrangements through the control bus SL. From there, the data is transferred to the associated Input/Output device which may either belong to group GR IV or GR V.

Similarly, the output data of the Input/Output devices, which are associated with the groups GRI to GRIII, is transferred to the output data bus ADL through output gates AUT and latch circuits.

Design of the Complete System

Figure 14:
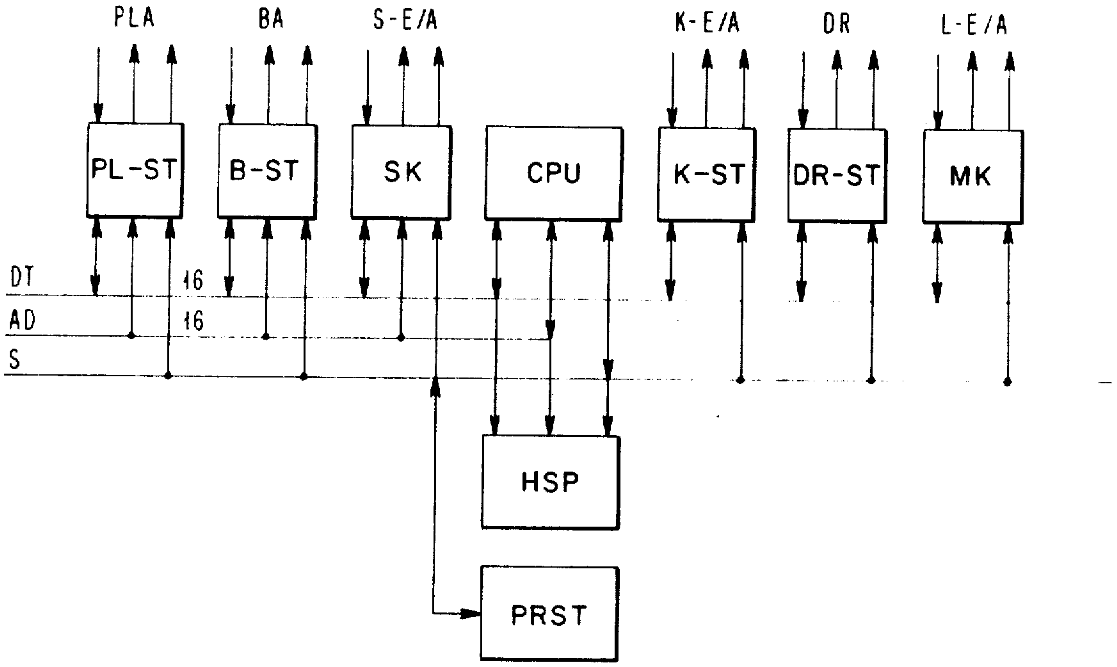
FIG. 14 is a block diagram of the complete system.

FIG. 14 shows the complete system which consists of a number of controls, which are very similar to the system control CPU previously described. The system control CPU cooperates with these controls through a bus system. The controls in accordance with FIG. 14 are "intelligent Input/Output controllers" which perform any function of a connecting control tailored to a specific Input/Output unit. Others of these controls serve as multiplex or selector channels. The system also comprises an additional unit, the storage PRST, which serves as a priority control. As is shown in FIG. 14, the system of the chosen example consists of a disk storage control PL–ST, which controls the disk drive PLA, a tape storage control B–St, which controls the tape drive BA, a card Input/Output control K–St, which controls the card Input/Output KE/A, and a printer control DR–ST for controlling the connected printer DR. The system also includes a selector channel SK and a multiplex channel MK for connecting a high-speed Input/Output device S–E/A and a low-speed Input/Output device L–E/A respectively.

The bus system which links all the units of the system as illustrated, consists of a 16-bit data bus DT, a 16-bit address bus AD and a control bus S. The control bus S includes two lines (two bits) for each system control CPU and each Input/Output controller. The individual units of the system are fully synchronized during their operation.

The bit position FETCH/STORE of the selection field SEL of the micro instruction (see FIG. 4) is directly linked with the control bus. When proceeding in the subsequent specification from a system consisting of a system control CPU and seven Input/Output controllers, the eight lines required necessitate an eight-bit address for the storage which is provided for the priority control PRST. Out of the eight output bits, one bit each is fed back to each of the above controls, CPU and CON. In cases where more than one control unit or the system control CPU simultaneously requests control through the bus system, the priority control unit PRST responds. The latter may consist, for example, of a simple read-only storage with a capacity of 256 words, in which a table is stored, by means of which the data indicating the priority of a control are logically linked with the data representing a request. This priority control unit PRST assigns control through the data bus DT, the storage address bus AD, and the control bus S, by keeping low-priority control units waiting. Priority may be assigned in the following order:

1. the specially tailored control units of the Input/Output devices,
2. the selector channel, 3. the specially tailored control units of the tape storage units, and
4. the system control CPU.

Priority is controlled by a control unit which has a control request to the bus system, and which cannot be received because the control unit has a lower priority than another control unit which simultaneously issues such a request, continuing to loop or repeat the same micro instruction or micro instruction sequence, while seeking access to the bus system. The relation between the data speeds of the Input/Output devices and the data speeds of the main storage is such that this loop is only repeated for the duration of a few storage cycles. During looping, no gate control signals are applied to the gate circuits which link the control unit with the bus system. By ORing, the control signals are rather fed to the next micro instruction sequential address. Thus, the microprogram can only be continued after the control unit has obtained access to the bus system. The system control CPU and the Input/Output device control units communicate with one another by storing control words in a reserved area of the main storage. This area serves a letterbox function, the units of the system being programmed so that they periodically interrogate their "letterbox" for information destined for them.

Error Correction

The lines of the data processing system are designed so as to permit bit parallel transmission of information from one unit to another. In contrast to existing systems using bit serial or partly bit parallel and partly bit serial transmission, it is possible for error-correcting arrangements to be connected in all stages, that means essentially to the in and output of the system elements. such as for example, to the working storages LS1 and LS 2. For this purpose, Hamming code regenerators can be employed, which, according to the degree of redundancy, are capable of correcting one, two or three error bits in a word.

Figure 15:
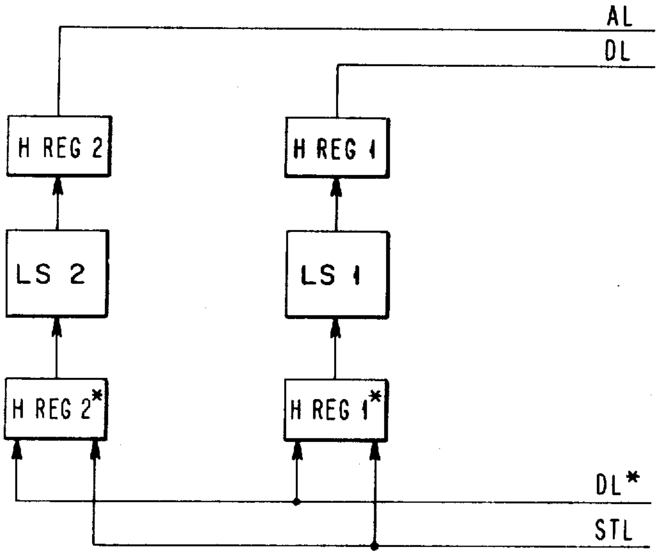
FIG. 15 is a block diagram of the error correction circuit connections.

FIG. 15 is a sectional view of FIG. 3, which shows in what manner the Hamming code regenerators can be employed in the data processing system in accordance with the invention. The Hamming code regenerator HREG 2 is, for example, connected to the output lines, such as, for example, the output lines of the working storage LS 2, which transfer address information to the address bus AL. Thus, depending upon the scope of the code used, one, two or several bits of an address word, which was erroneously read from storage, can be regenerated. The inputs of these system elements are also provided with Hamming code regenerators to reduce to a minimum the transmission of erroneous data to the corresponding lines.

The design of the data processing system in accordance with the invention permits the Hamming code regenerators or other error correcting arrangements being realized in the form of tables which are stored in read-only storages. Example of a Micro Instruction Set

TABLE 4

| Name | Meaning |
|---|---|
| ADD | binary addition — an overflow carry forces a "1" in the lowest bit of the address of the next micro instruction. |
| AND | ANDing of operands |
| XOR | EXCLUSIVE ORing of operands |
| INVERT | inversion of operands |
| USE (U) | the four low order bits of R 1 and the address of the next micro instruction are XORed |
| SHIFT (S) | shifting — amount of shifting is set in R 2 |
| MOVE (M) | transferring — zero shifting |
| TEST | if the 4 low order bits of R 1 and the mask |
| UNDER set in R 2 are not in compliance with each | |
| MASK AND other, the low order bit of the next micro | |
| BRANCH (TMB) | instruction is changed. |
| FETCH (F) | fetching information from main storage |
| STORE (ST) | writing information into main storage. Distinction being possible by the LS 1–code. All E–/A operations are routed through the main storage. |

Explanation of the Micro Instruction Fields

As previously mentioned, FIG. 4 shows the format of a micro instruction. The fields defined in this micro instruction are coded and have the meaning indicated in the following Table 5.

TABLE 5

| Field | Code | Meaning |
|---|---|---|
| LS 1 | 00 | LS 1 rests |
| | 01 | reading from LS 1 and writing into HSP |
| | 10 | writing into LS 1 and reading from HSP |
| | 11 | LS 1 reading and writing |
| LS 2 | 00 | LS 2 rests |
| | 01 | reading from LS 2 and writing into HSP |
| | 10 | writing into LS 2 and reading from HSP |
| | 11 | reading and writing |
| AM | 00 | BINAD (binary addition) |
| | 01 | AND (AND) |
| | 10 | INVERT (inversion) |
| | 11 | XOR (exclusive OR) |
| SEL | 0001 | AM (unit AM) |
| | 0010 | SH (unit SH) |
| | 0100 | BR (unit BR) |
| | 1000 | FETCH/STORE (read,store) |
| R 1 | | selection of one out of 64 registers in LS 1 |
| R 2 | | selection of one out of 64 registers in LS 2, in addition the amount of shift is specified |
| | 001 | 2 bits to the left |
| | 010 | 1 bit to the left |
| | 011 | zero shift |
| | 100 | 1 bit to the right |
| | 101 | 2 bits to the right |
| | 001 | 8 bits to the left/right |
| | 010 | 4 bits to the left |
| | 011 | zero shift |
| | 100 | 4 bits to the right |

Multiplication Example

In the following, a multiplication example is used to illustrate the operation of the system control, which, as previously mentioned, only consists of storagelike structures in which tables with arithmetic and logic data are stored. The example refers to the multiplication of the binary numbers 110 and 101:

```
        110 × 101 = 11110
        110
       000
      110
TOTAL 11110
```

Figures 16, 17:
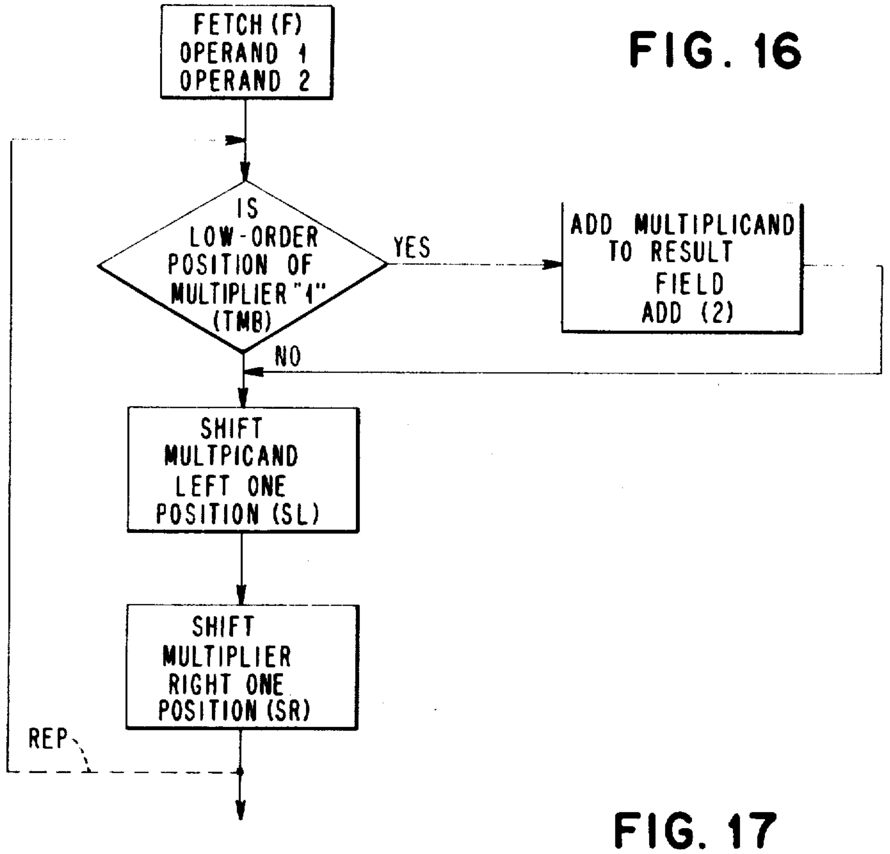
FIG. 16 is a flow chart for a multiplication example.
FIG. 17 represents the register contents of two working storages during a microprogram for a multiplication.

FIG. 16 is a microprogram flow chart for the multiplication. As for the following description only the typical operation of the control arrangements if of importance, no consideration is given to the effectivity of the program. First of all, the two operands, which are to be linked with each other by multiplication, are fetched from the main storage HSP by means of a fetch instruction (F). The first operand, representing the multiplicand, is transferred from the main storage to register 3 of the working storage LS 1. FIG. 17 gives a survey of the contents of registers 1 to 64 of the two working storages LS 1 and LS 2. In the left-most column the number of the micro instruction and the relevant abbreviation (the latter in brackets) are indicated. The columns continuing to the right constitute the individual register stages. The last column, finally, gives the address of the next micro instruction to be fetched. The second micro instruction of the multiplication microprogram fetches the second operand, the muliplier, from the main storage and transfers the same to the register with the address 5 of the working storage LS 1. With the aid of a test mask it is determined whether the low order position of the multiplier is a one. To this end, the test mask and branch operation (TMB) is employed, whereby the test mask is stored in the register defined by field R 2 of the micro instruction. In the present case, the mask is stored in register 5 of the working storage LS 2. As the multiplier position in question contains a one at the location defined by the mask, a branch is taken to the micro instruction ADD 2, which, as shown in FIG. 17, has the address 10000001. The flow chart of FIG. 16 shows that the multiplicand is added into the result field. ADD 2 identifies the result field as being in the working storage LS 2. As is illustrated in FIG. 17, this field is stored in register 3 of the working storage LS 2. This micro instruction is adjoined by two further micro instructions, the first one of which shifts the multiplicand by one position to the left, while the second shifts the multiplier by one position to the right. The direction and the amount of shift are defined by the corresponding micro instruction (S) in field R 2. Table 5 shows the shift coding. For the left shift the relevant binary coding is 010, which is stored in the working storage LS 2 in register stage 1. For the right shift, the binary coding 100 is stored in the working storage LS 2 in register stage 2. As is further illustrated in FIG. 16, this loop must be repeated as many times as there are binary positions in the multiplicator. Upon completion of multiplication, the result appears in the result field, that means in the register with the address 2 of the working storage LS 2.

As in the chosen examples of FIG. 17 the number of positions of the result field was limited to four, the field does not contain the complete result of the multiplication. The operations required for restoring the operand in the main storage are not included in the microprogram either. Moreover, the above example does not consider output operations.

While the invention has been shown and described with reference to preferred embodiments therof, it will be clear to those skilled in the art that various changes in the form and details thereof may be made without departing from the spirit and scope of the invention.

What is claimed is:

1. An electronic data processing system with Input/Output units, with storage units in which tables of arithmetic functions are stored, and with bus systems for the transmission of data, addresses and control signals between system elements, the system comprising:

a number of autonomous system elements representing the system control and the control of the Input/Output devices;

said system elements being interconnected by said bus systems;

said system elements comprising further storages which contain tables for performing logic functions and which contain micro-programs tailored to the functions of the Input/Output devices;

said system elements also comprising decoders for decentrally decoding instructions at the location of execution in the system elements; and a branch unit in which a truth table for performing the logic function $d = (b \wedge c) \vee a$ is stored;

said branch unit being coupled to a portion of said further storage containing a micro-program in such a manner as to form a part $d$ of the address of the next micro instruction in accordance with this logic function, wherein the values $a$ are transmitted to the branch unit from said portion of said further storage, the values $b$ are transmitted to the branch unit from the data bus common to the system control, while the values $c$ are transferred from the common address bus.

2. An electronic data processing system in accordance with claim 1 further including:

control units for controlling Input/Output devices are incorporated in and connected to the system control through buses;

said control units differing from the system control and the other control units only by the microprogram stored in them; and said control units being linked with the bus of the system control or the Input/Output devices through parallel gate circuits.

3. Electronic data processing system in accordance with claim 2 further comprising:

priority control means comprising a storage in which is stored a table with the priorities of the units and a truth table for logically combining a priority with a request from a unit;

said priority control means being connected to the remaining system elements only through the control bus.

4. An electronic data processing system in accordance with claim 3, wherein:

gate circuits integrated in the storage substrates control the function of the buses as input or output lines.

5. An electronic data processing system in accordance with claim 4 further comprising:

areas of storage which are permanently associated with the individual system control elements;

said areas of storage being caused to store control words when system controls communicate with Input/Output control devices.

* * * * *